US012211319B2

(12) United States Patent
Zhu et al.

(10) Patent No.: US 12,211,319 B2
(45) Date of Patent: Jan. 28, 2025

(54) METHOD, APPARATUS AND SYSTEM FOR CUSTOMER GROUP ANALYSIS, AND STORAGE MEDIUM

(71) Applicant: BOE Technology Group Co., Ltd., Beijing (CN)

(72) Inventors: Dan Zhu, Beijing (CN); Xingchen Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/761,021

(22) PCT Filed: Apr. 20, 2021

(86) PCT No.: PCT/CN2021/088537
§ 371 (c)(1),
(2) Date: Mar. 16, 2022

(87) PCT Pub. No.: WO2022/222051
PCT Pub. Date: Oct. 27, 2022

(65) Prior Publication Data
US 2024/0046699 A1 Feb. 8, 2024

(51) Int. Cl.
*G06V 40/20* (2022.01)
*G06F 3/01* (2006.01)
(Continued)

(52) U.S. Cl.
CPC .............. *G06V 40/20* (2022.01); *G06F 3/012* (2013.01); *G06T 7/70* (2017.01); *G06V 20/53* (2022.01); *G06V 40/161* (2022.01)

(58) Field of Classification Search
CPC ................ G06F 3/012; G06Q 30/0201; G06Q 30/0241; G06Q 30/0242;
(Continued)

(56) References Cited

U.S. PATENT DOCUMENTS

2008/0059994 A1* 3/2008 Thornton ............... G06Q 30/02
725/32
2008/0297587 A1* 12/2008 Kurtz ..................... G06V 40/20
348/E7.083
(Continued)

FOREIGN PATENT DOCUMENTS

CN 101324945 A 12/2008
CN 101847218 A 9/2010
(Continued)

OTHER PUBLICATIONS

Jella Pfeiffer et al., "Eye-Tracking-Based Classification of Information Search Behavior Using Machine Learning: Evidence from Experiments in Physical Shops and Virtual Reality Shopping Environments,"May 13, 2020, Information Systems Research, vol. 31, No. 3, Sep. 2020, pp. 675-687.*
(Continued)

*Primary Examiner* — Omar S Ismail
(74) *Attorney, Agent, or Firm* — Workman Nydegger (57) ABSTRACT

The present disclosure discloses a method, apparatus and system for customer group analysis, and a storage medium. The method includes: obtaining video images of a customer group passing by a display apparatus; recognizing and tracking head images of the customer group in the video images, and determining behavior characteristics of individuals in the customer group; and performing statistical analysis on the behavior characteristics of the customer group corresponding to the display apparatus, so as to update a quantity of individuals corresponding to each behavior characteristic.

15 Claims, 5 Drawing Sheets

(51) Int. Cl.
*G06T 7/70* (2017.01)
*G06V 20/52* (2022.01)
*G06V 40/16* (2022.01)

(58) Field of Classification Search
CPC . G06T 2207/10016; G06T 2207/10024; G06T 2207/10048; G06T 2207/20076; G06T 2207/20084; G06T 2207/30201; G06T 2207/30242; G06T 7/20; G06T 7/70; G06T 7/73; G06V 20/53; G06V 40/161; G06V 40/20
See application file for complete search history.

(56) References Cited

U.S. PATENT DOCUMENTS

| | | | |
|---|---|---|---|
| 2013/0054377 A1* | 2/2013 | Krahnstoever | G09F 27/00 705/14.66 |
| 2014/0156398 A1* | 6/2014 | Li | G06Q 30/0269 705/14.66 |
| 2016/0261793 A1* | 9/2016 | Sivan | G06F 3/013 |
| 2017/0006215 A1* | 1/2017 | Leung | G08B 13/19606 |
| 2017/0286780 A1* | 10/2017 | Zhang | G06F 18/2148 |
| 2021/0307621 A1* | 10/2021 | Svenson | A61B 5/015 |
| 2022/0150414 A1* | 5/2022 | Almehmadi | G06V 10/62 |

FOREIGN PATENT DOCUMENTS

| | | |
|---|---|---|
| CN | 102081810 A | 6/2011 |
| CN | 102982753 A | 3/2013 |
| CN | 103493068 A | 1/2014 |
| CN | 105825408 A | 8/2016 |
| CN | 106971317 A | 7/2017 |
| CN | 107798560 A | 3/2018 |
| CN | 208225374 U | 12/2018 |
| CN | 111784406 A | 10/2020 |
| CN | 112163880 A | 1/2021 |
| WO | WO-2016147086 A1 * | 9/2016 |

OTHER PUBLICATIONS

Erik Murphy-Chutorian, "Head Pose Estimation and Augmented Reality Tracking: an Integrated System and Evaluation for Monitoring Driver Awareness,"May 25, 2010, IEEE Transactions on Intelligent Transportation Systems, vol. 11, No. 2, Jun. 2010, pp. 300-310.*

Kuno Kurzhals et al., "Visual Analytics for Mobile Eye Tracking,"Oct. 23, 2016, IEEE Transactions on Visualization and Computer Graphics vol. 23, No. 1, Jan. 2017, pp. 301-307.*

Takehiko Ohno et al., "A Free-head, Simple Calibration, Gaze Tracking System That Enables Gaze-Based Interaction," Mar. 22, 2004, ETRA '04: Proceedings of the 2004 symposium on Eye tracking research & applications Mar. 2004, pp. 115-121.*

Zhiwei Zhu et al., "Novel Eye Gaze Tracking Techniques Under Natural Head Movement,"Dec. 11, 2007, IEEE Transactions on Biomedical Engineering, vol. 54, No. 12, Dec. 2007, pp. 2246-2258.*

* cited by examiner

METHOD, APPARATUS AND SYSTEM FOR CUSTOMER GROUP ANALYSIS, AND STORAGE MEDIUM

CROSS-REFERENCE TO RELATED APPLICATIONS

This application is a National Stage of International Application No. PCT/CN2021/088537, filed Apr. 20, 2021 which is hereby incorporated by reference in its entirety.

FIELD

The present disclosure relates to the field of media, in particular to a method, apparatus and system for customer group analysis, and a storage medium.

BACKGROUND

Advertising in public places, such as subway and shopping malls, requires to purchase advertising spots first.

For an advertisement operator, it is necessary to price advertising spots in different locations and different periods of time; and for media companies, it is necessary to select an advertising spot and an advertising period of time with the maximum exposure for advertising. Such pricing decisions and advertising decisions require accurate customer group analysis on advertising spots.

SUMMARY

In the first aspect, the technical solution of a method for customer group analysis provided by an embodiment of the present disclosure is as follows:
  obtaining video images of a customer group passing by a display apparatus;
  recognizing and tracking head images of the customer group in the video images, and determining behavior characteristics of individuals in the customer group; and
  performing statistical analysis on the behavior characteristics of the customer group corresponding to the display apparatus, so as to update a quantity of individuals included in each behavior characteristic.

In some embodiments, the recognizing and tracking head images of the customer group in the video images, and determining the behavior characteristics of each individual in the customer group, includes:
  recognizing the head images of the individuals, in the video images frame by frame, and obtaining a first head image set included in each frame of image;
  screening out head images that reach a first preset size from the first head image set included in each frame of image to obtain a second head image set corresponding to each frame of image; and
  tracking each head image in the second head image set to determine the behavior characteristics of each individual in the customer group.

In some embodiments, the determining the behavior characteristics of each individual in the customer group includes:
  determining individuals corresponding to head images that have not been continuously tracked a set number of times in the second head image set as individuals in an invalid customer group, and determining corresponding behavior characteristics as leaving the display apparatus;
  determining individuals corresponding to head images that have been continuously tracked the set number of times as individuals in a valid customer group, and determining a first behavior characteristic as passing by the display apparatus; and
  determining a second behavior characteristic of the individuals in the valid customer group according to an attention duration of each individual in the valid customer group paying attention to the display apparatus.

In some embodiments, the determining the second behavior characteristics of the individuals in the valid customer group according to the attention duration of each individual in the valid customer group paying attention to the display apparatus includes:
  detecting face angles of head images corresponding to the valid customer group in each frame of image, and determining a face angle of each individual in the valid customer group in the corresponding frame of image, wherein the face angle is an angle at which the face of each individual deviates from facing the display apparatus;
  determining individuals with corresponding face angles being within a valid viewing angle range of the display apparatus in the valid customer group as individuals in a viewing customer group, wherein the valid viewing angle range is a view angle range at which the individuals can see display information of the display apparatus; and
  determining a second behavior characteristic of the individuals in the viewing customer group according to an attention duration of each individual in the viewing customer group paying attention to the display apparatus.

In some embodiments, the determining the second behavior characteristic of the individuals in the viewing customer group according to the attention duration of each individual in the viewing customer group paying attention to the display apparatus includes:
  determining individuals whose attention durations reach a preset attention duration in the viewing customer group as individuals in a valid attention customer group, and a second behavior characteristic as paying attention to the display apparatus; and
  determining individuals whose attention durations do not reach the preset attention duration in the viewing customer group as individuals in an invalid attention customer group, and a second behavior characteristic as reaching the display apparatus.

In some embodiments, determining the attention duration of each individual in the viewing customer group paying attention to the display apparatus includes:
  obtaining a quantity of frames in which each individual in the viewing customer group is continuously determined as an individual in the viewing customer group in the video images; and
  determining the attention duration of each individual in the viewing customer group according to the quantity of frames and a collection rate of a video.

In some embodiments, after determining the individuals whose attention durations reach the preset attention duration in the viewing customer group as the individuals of the valid attention customer group, the method further includes:
  screening out head images that reach a second preset size and preset image quality from head images corresponding to the valid attention customer group to obtain a third head image set;

recognizing face attributes of each head image in the third head image set;

determining a quantity of individuals corresponding to each face attribute according to the face attributes of each head image in the third head image set, and; and determining a face attribute containing a largest quantity of individuals as a group attribute of the valid attention customer group.

In some embodiments, the determining the quantity of individuals corresponding to each face attribute includes:

recognizing the face attributes of each individual in the third head image set N times, wherein N is a natural number;

accumulating a value of 1 for the corresponding face attribute of the corresponding individual in response to a face attribute recognition being completed for each individual;

determining a face attribute with a highest accumulated value among the various face attributes corresponding to each individual as a final face attribute of the corresponding individual; and determining the quantity of individuals corresponding to each face attribute according to the individuals corresponding to the final face attributes.

In the second aspect, an embodiment of the present disclosure provides an apparatus for customer group analysis, including:

an obtaining unit configured to obtain video images of a customer group of a display apparatus, wherein the display apparatus is a display region for displaying media information;

a determining unit configured to recognize and track head images of the customer group in the video images, and determine behavior characteristics of individuals in the customer group; and an analyzing unit configured to perform statistical analysis on the behavior characteristics of the customer group corresponding to the display apparatus, so as to update a quantity of individuals included in each behavior characteristic.

In some embodiments, the determining unit is configured to:

recognize the head images of the individuals, in the video images frame by frame, and obtain a first head image set included in each frame of image;

screen out head images that reach a first preset size from the first head image set included in each frame of image to obtain a second head image set corresponding to each frame of image; and track each head image in the second head image set to determine the behavior characteristics of each individual in the customer group.

In some embodiments, the determining unit is further configured to:

determine individuals corresponding to head images that have not been continuously tracked a set number of times in the second head image set as individuals in an invalid customer group, and determine corresponding behavior characteristics as leaving the display apparatus;

determine individuals corresponding to head images that have been continuously tracked the set number of times as individuals in a valid customer group, and determine a first behavior characteristic as passing by the display apparatus; and determine a second behavior characteristic of the individuals in the valid customer group according to an attention duration of each individual in the valid customer group paying attention to the display apparatus.

In some embodiments, the determining unit is further configured to:

detect face angles of head images corresponding to the valid customer group in each frame of image, and determine a face angle of each individual in the valid customer group in the corresponding frame of image, wherein the face angle is an angle at which the face of each individual deviates from facing the display apparatus;

determine individuals with corresponding face angles being within a valid viewing angle range of the display apparatus in the valid customer group as individuals in a viewing customer group, wherein the valid viewing angle range is a view angle range at which the individuals can see display information of the display apparatus; and determine a second behavior characteristic of the individuals in the viewing customer group according to an attention duration of each individual in the viewing customer group paying attention to the display apparatus.

In some embodiments, the determining unit is further configured to:

determine individuals whose attention durations reach a preset attention duration in the viewing customer group as individuals in a valid attention customer group, and corresponding second behavior characteristics as paying attention to the display apparatus; and determine individuals whose attention durations do not reach the preset attention duration in the viewing customer group as individuals in an invalid attention customer group, and a second behavior characteristic as reaching the display apparatus.

In some embodiments, the determining unit is further configured to:

obtain a quantity of frames in which each individual in the viewing customer group is continuously determined as an individual in the viewing customer group in the video images; and determine the attention duration of each individual in the viewing customer group according to the quantity of frames and a collection rate of a video.

In some embodiments, the determining unit is further configured to:

screen out head images that reach a second preset size and preset image quality from head images corresponding to the valid attention customer group to obtain a third head image set;

recognize face attributes of each head image in the third head image set;

determine a quantity of individuals corresponding to each face attribute according to the face attributes of each head image in the third head image set; and determine a face attribute containing a largest quantity of individuals as a group attribute of the valid attention customer group.

In some embodiments, the determining unit is further configured to:

recognize the face attributes of each individual in the third head image set N times, wherein N is a natural number;

accumulate a value of 1 for the corresponding face attribute of the corresponding individual in response to a face attribute recognition being completed for each individual;

determine a face attribute with a highest accumulated value among the various face attributes corresponding to each individual as a final face attribute of the corresponding individual; and determine the quantity of individuals corresponding to each face attribute according to the individuals corresponding to the final face attributes.

On the third aspect, an embodiment of the present disclosure further provides a system for customer group analysis, including:

an image collection device configured to collect video images of a customer group corresponding to a display apparatus; and a control device configured to obtain the video images from the image collection device and perform the above method for customer group analysis.

In some embodiments, the system further includes:

an interactive device configured to display data obtained by the control device to a user.

In some embodiments, the interactive device is further configured to display corresponding query results according to query information input by the user.

In some embodiments, the display apparatus includes:

a media player, or a media display board.

In some embodiments, the image collection device includes:

a visible light image collection device, or an infrared image collection device.

In some embodiments, the visible light image collection device includes:

a visible light image sensor, or a visible light image shooting device.

In some embodiments, the infrared image collection device includes:

an infrared image sensor, or an infrared thermal imager.

On the fourth aspect, an embodiment of the present disclosure further provides an apparatus for customer group analysis, including:

at least one processor, and a memory connected to the at least one processor, wherein the memory stores instructions executable by the at least one processor, and the at least one processor executes the method according to the first aspect above by executing the instructions stored in the memory.

On the fifth aspect, an embodiment of the present disclosure further provides a readable storage medium, including:

a memory, wherein the memory is configured to store instructions that, when executed by a processor, enable an apparatus including the readable storage medium to implement the method according to the first aspect above.

DETAILED DESCRIPTION OF THE EMBODIMENTS

Embodiments of the present disclosure provide a method, apparatus and system for customer group analysis, and a storage medium, so as to solve the above technical problems existing in the related art.

In order to better understand the above technical solution, the technical solution of the present disclosure will be described in detail below through accompanying drawings and specific embodiments. It should be understood that the embodiments of the present disclosure and the technical features in the embodiments are a detailed description of the technical solution of the present disclosure, rather than the limitation of the technical solution of the present disclosure, and the embodiments of the present disclosure and the technical features in the embodiments may be combined with each other if there is no conflict.

Figure 1:
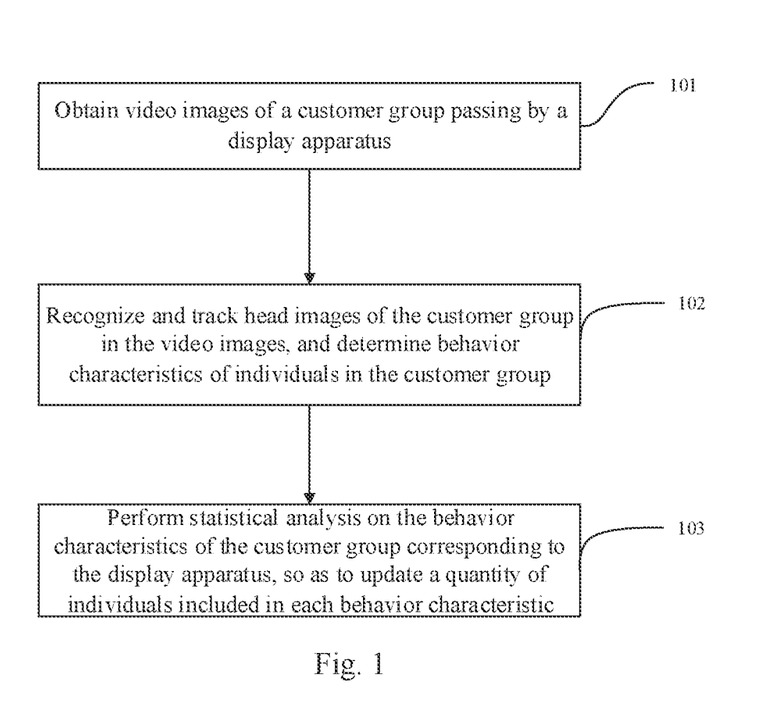
FIG. 1 is a flowchart of a method for customer group analysis according to an embodiment of the present disclosure.

Please refer to FIG. 1, an embodiment of the present disclosure provides a method for customer group analysis, and the processing process of the method is as follows.

Step 101: video images of a customer group passing by a display apparatus are obtained.

The display apparatus may be a media player, such as an advertising machine, an LED display, a liquid crystal display and the like, and the display apparatus may also be a media display board, such as an advertising board and a display board.

The video images of the customer group passing by the display apparatus may be provided after being collected by a third party, or may be directly collected by an image collection device installed near the display apparatus.

The image collection device may include a visible light image collection device, such as a visible light image sensor (such as a CCD sensor), and a visible light image shooting device (such as a camera and a monitoring device). The image collection device may also include an infrared image collection device, such as an infrared image sensor and a thermal imager.

For example, the video images of the customer group passing by the display apparatus are directly collected by a camera installed in the middle position of the top of a media display, and then the video images of the customer group passing by the display apparatus may be obtained from the camera.

For another example, if the video images of the customer group passing by the display apparatus are obtained from the third party, the video images of the customer group passing by the display apparatus may be obtained from a communication address provided by the third party.

When the video images are collected by using the visible light image shooting device, the video images are visible light video images (such as a high-definition color image); and when the video images are collected by using the infrared image collection device, the video images are infrared video images.

By using the visible light image shooting device to shoot the video images, more facial features of the customer group may be obtained, which may improve the accuracy of analysis on attributes of the customer group subsequently.

By using the infrared image collection device to shoot the video images, because in the obtained infrared video images, each frame of image is imaged with human body temperature distribution and cannot show detailed facial features of the customer group, the form of the customer group may be obtained, but physical appearance information of the customer group will not be leaked, which can not only provide necessary information for subsequent analysis of behavior characteristics of the customer group, but also protect the physical appearance information of the customer group from being leaked. At the same time, a temperature alarm function is also achieved during epidemic prevention and control.

After the video images of the customer group passing by the display apparatus are obtained, step 102 may be executed.

Step 102: head images of the customer group in the video images are recognized and tracked, and behavior characteristics of individuals in the customer group are determined.

When the individuals in the video images are not covered, by recognizing and tracking the head images of the customer group in the video images, the behavior characteristics of each individual in the customer group may be determined. When some individuals in the video images are covered, by recognizing and tracking the head images of the customer group in the video images, the behavior characteristics of the uncovered individuals in the customer group may be determined.

In some embodiments, recognizing and tracking the head images of the customer group in the video images, and determining the behavior characteristics of the individuals in the customer group may be implemented by adopting the following manners.

The head images of the individuals, in the video images are recognized frame by frame, and a first head image set included by each frame of image is obtained; head images that reach a first preset size are screened out from the first head image set included in each frame of image to obtain a second head image set corresponding to each frame of image; and each head image in the second head image set is recognized and tracked to determine the behavior characteristics of each individual in the customer group.

Recognizing the head images of the individuals, in the video images frame by frame may adopt a special human head/face detection algorithm, such as yolov5 series, resnet18 series, R-CNN series, and mobilenet series.

After the first head image set included in each frame of image is obtained, the head images in which corresponding sizes of heads reach the first preset size are screened out therefrom to form the second head image set corresponding to each frame of image. Of course, the above identification and screening processes may also be carried out together. For example, if the head of an individual is recognized, whether a corresponding size of the head reaches the first preset size or not is judged, and then a target tracking algorithm is used to track each head image in the second head image set to determine the behavior characteristics of each individual in the customer group corresponding to the display apparatus.

The first preset size may be a size of a head image of an individual shot at a specific position, wherein the specific position is a position corresponding to the farthest distance that the individual may correctly read display information from the display apparatus. By screening out the head images with the head sizes reaching the first preset size from the first head image set corresponding to each frame of images, and using the head images in the second head image set obtained after screening for tracking, the workload may be reduced, and the processing speed may be increased.

The target tracking algorithm may include, for example, meanshift, sort, particle filter-based motion estimation, contour-based tracking, and AI-based target tracking (MDNet, TCNN, SiamFC, GOTURN, etc.).

In some embodiments, determining the behavior characteristics of each individual in the customer group may be implemented by adopting the following manner.

Individuals corresponding to head images that have not been continuously tracked a set number of times in the second head image set are determined as individuals in an invalid customer group, and corresponding behavior characteristics are determined as leaving the display apparatus; individuals corresponding to head images that have been continuously tracked the set number of times are determined as individuals in a valid customer group, and corresponding first behavior characteristics are determined as passing by the display apparatus; and second behavior characteristics of the individuals in the valid customer group are determined according to an attention duration of each individual in the valid customer group paying attention to the display apparatus.

For example, the second head image set corresponding to a certain frame of image in the video images is S1, including 3 head images (3 corresponding individuals are denoted as P1-P3), head images of the 3 individuals are tracked by using a sort algorithm, it is determined that the individual P1 is continuously tracked 3 times, the individual P2 is continuously tracked 5 times, and the individual P3 is continuously tracked 1 time, and it is assumed that the set number of times is 3.

According to the above tracking result, it may be determined that the numbers of times that the individuals P1 and P2 are continuously tracked reach the set number of times, namely 3 times, and the individuals P1 and P2 are determined as the individuals in the valid customer group, and corresponding first behavior characteristics are determined as passing by the display apparatus; while the number of times that the individual P3 is continuously tracked does not reach the set number of times, namely 3 times, and behavior characteristic of the individual P3 is determined as leaving the display apparatus.

It should be understood that the above tracking process involves a plurality of frames of images instead of one frame of image. The individual P1 being determined as having been tracked 3 times in the current frame of image means that the individual P1 has been tracked in the previous 2 frames of image; and the individual P3 being determined as having been tracked 1 time in the current frame of image means that the individual P3 appears for the first time in the current frame of image, and does not appear in the next frame of image, thereby determining that the individual P3 has been tracked 1 time.

After the valid customer group with the behavior characteristics being passing by the display apparatus are determined in the above manner, the behavior characteristics of the valid customer group may be further analyzed to determine the second behavior characteristics of the valid customer group, so as to determine individuals who actually read the information from the display apparatus in the valid customer group.

Determining the second behavior characteristics of the individuals in the valid customer group according to the attention duration of each individual in the valid customer group paying attention to the display apparatus may be implemented by adopting the following manner.

Face angles of head images corresponding to the valid customer group in each frame of image are detected, and a face angle of each individual in the valid customer group in the corresponding frame of image is determined, wherein the face angle is an angle at which the face of each individual deviates from facing the display apparatus; individuals with corresponding face angles being within a valid viewing angle range of the display apparatus in the valid customer group are determined as individuals in a viewing customer group, wherein the valid viewing angle range is a view angle range at which the individuals may see the display information of the display apparatus; and second behavior characteristics of the individuals in the viewing customer group are determined according to an attention duration of each individual in the viewing customer group paying attention to the display apparatus.

Before the face angles of the corresponding head images are detected, the recognized head images and face images may also be associated, for example, being implemented by adopting an IOU algorithm.

Face key point detection algorithms (such as AI models of the DCNN, TCDCN, MTCNN, and PFLD) may be used to detect face key points in the head images, and then determine the face angles (when the face is toward the display apparatus, a corresponding face angle is 0°; and when an individual turns the head, the face is no longer towards the display apparatus, and an angle between the facing direction of the face after the head is turned and the direction toward the display apparatus is the angle at which the face deviates from facing the display apparatus). By judging whether the face angle is within the valid viewing angle range, it is determined whether the individual corresponding to the head image pays attention to the information displayed by the display apparatus. If it is determined that the face angle is not within the valid viewing angle range, it is determined that the corresponding individual does not view the display apparatus but only passes by the display apparatus. Such an individual only has a first behavior characteristic: passing by the display apparatus.

If it is determined that the face angle corresponding to a certain head image is within the valid viewing angle range, it may be determined that the individual has viewed the display apparatus, and such an individual may be determined as an individual in the viewing customer group. Further, according to the attention duration of the individuals in the viewing customer group paying attention to the display apparatus, the second behavior characteristics of the individuals in the viewing customer group are determined.

Determining the second behavior characteristics of the individuals in the viewing customer group according to the attention duration of each individual in the viewing customer group paying attention to the display apparatus may be implemented in the following manner.

Individuals whose attention durations reach a preset attention duration in the viewing customer group are determined as individuals in a valid attention customer group, and corresponding second behavior characteristics are determined as paying attention to the display apparatus; and individuals whose attention durations do not reach the preset attention duration in the viewing customer group are determined as individuals in an invalid attention customer group, and corresponding second behavior characteristics are determined as reaching the display apparatus.

Determining the attention duration of each individual in the viewing customer group paying attention to the display apparatus may be implemented in the following manner: a quantity of frames in which each individual in the viewing customer group is continuously determined as an individual in the viewing customer group in the video images; and the attention duration of each individual in the viewing customer group is determined according to the quantity of frames and a collection rate of a video.

For example, the individual P2 is determined as an individual in the viewing customer group in 5 consecutive frames of images, a collection rate of real-shot images is m seconds per frame, and it may be determined that the attention duration of the individual P2 is 5*m seconds. Assuming that the preset attention duration is 3*m seconds, it may be determined that the individual P2 is an individual in the valid attention customer group, and a corresponding second behavior characteristic is paying attention to the display apparatus, that is, the individual P2 has actually read the information displayed by the display apparatus. If the preset attention duration is 6*m seconds, it may be determined that the individual P2 is an individual in the invalid attention customer group, and the corresponding second behavior characteristic is reaching the display apparatus, that is, the sight of the individual P2 only touches the display apparatus at a certain moment, but the individual P2 does not actually read the information displayed by the display apparatus.

In some embodiments, after the individuals whose attention durations reach the preset attention duration in the viewing customer group are determined as the individuals in the valid attention customer group, face attribute analysis may be further performed on the valid attention customer group, which may be implemented in the following manner.

Head images that reach a second preset size and preset image quality are screened out from head images corresponding to the valid attention customer group to obtain a third head image set; face attributes of each head image in the third head image set are recognized; statistical analysis is performed on the face attributes of each head image in the third head image set, and a quantity of individuals included in each face attribute is determined; and a face attribute containing a largest quantity of individuals is determined as a group attribute of the valid attention customer group.

The face attributes may include: age group (such as 3-17 years old, 18-39 years old, 40-59 years old, 60 years old or above, etc.), gender, wearing sunglasses, wearing a mask, etc. The valid attention customer group is influenced by the individuals' location, clothing, posture, etc., and the image quality of the obtained head images is not the same. Therefore, the head images corresponding to the valid attention customer group need to be screened. The size of the head images screened out needs to reach the second preset size and the preset image quality.

The second preset size may be, for example, 50*50 pixels. Of course, it may also be set to other values according to actual needs, which is not limited here. Whether the preset image quality is met may be determined according to the preset face quality. For example, non-faces (such as animals, dolls, masks and portraits) in the valid attention customer group may be removed through a non-face model, and blurred faces in the valid attention customer group may be removed through a blur face model. Similar models may further include: models that detect features such as covered faces, wearing sunglasses, super-angle faces, wearing a mask, smiling, gender, and babies. When the features such as non-faces, blurred faces, covered faces, wearing sunglasses, super-angle faces, and wearing a mask are detected out, corresponding head images may be removed, and the rest are head images meeting the preset image quality, so the third head image set is obtained, which can reduce the error rate of face attribute recognition.

It should be noted that, in the above exemplified features, when a certain or some features such as wearing sunglasses and wearing a mask are used as face attributes, corresponding head images may not be removed. For the recognition of the non-faces, recognition and removal may be completed before the first head image set corresponding to each frame of image is determined, that is to say, the head images included in the first head image set do not include non-face images, which can improve the accuracy of customer group analysis. If the first head image set does not include the non-face images, it is not necessary to use the non-face model again for recognition when whether the head images meet the preset image quality is judged.

The face attributes of each head image in the third head image set are recognized, statistical analysis is performed to obtain the face attributes belonging to the same individual, the quantity of individuals included in each face attribute is determined, and the face attribute containing the largest quantity of individuals is determined as the group attribute of the valid attention customer group. For example, in the third head image set corresponding to a certain quantity of video images, the quantity of individuals in the age group 3-17 is 100, the quantity of individuals in the age group 18-39 is 3000, the quantity of individuals in the age group 40-59 is 2000, and the quantity of individuals in the age group 60 or above is 500, so it may be determined that the group attribute of the valid attention customer group is the age group of 18-39 years old, that is to say, the information displayed by the display apparatus corresponding to the video images attracts the attention of individuals in the age group of 18-39 years old.

In some embodiments, performing statistical analysis on the face attributes of each head image in the third head image set, and determining the quantity of individuals included in each face attribute may also be implemented in the following manner.

The face attributes of each individual in the third head image set are recognized N times, wherein N is a natural number; a value of 1 is accumulated for the corresponding face attribute of the corresponding individual each time face attribute recognition is completed for each individual; a face attribute with a highest accumulated value among the various face attributes corresponding to each individual is determined as a final face attribute of the corresponding individual; and the quantity of individuals included in each face attribute is determined according to the individuals corresponding to the final face attributes.

For example, assuming that N is 7, the individual P3 in the third head image set is subjected to face attribute recognition 7 times, and the age group of the individual P3 is recognized as 18-39 for the first time, 3-17 for the second time, 18-39 for the third to sixth times, and 3-17 for the seventh time. Therefore, it may be determined that the face attributes of the individual P3 include: age groups 3-17 and 18-39, wherein the cumulative value of the age group 3-17 is 2, and the cumulative value of the age group 18-39 is 5, that is to say, after the individual P3 is subjected to face attribute recognition many times, the individual P3 is identified as 18-39 years old 5 times and 3-17 years old twice. The age group 18-39 with the highest cumulative value among the above two face attributes corresponding to the individual P3 is determined as the final face attribute of the individual P3, which can improve the accuracy of face attribute recognition.

In the same way, the face attributes of other individuals in the third head image set are recognized many times to determine the final face attribute of each individual. Finally, according to the individuals corresponding to the final face attributes, the quantity of individuals included in each face attribute is determined. For example, according to the individuals corresponding to the final face attributes, it is determined that there are 80 individuals in the age group 3-17 years old, 4000 individuals in the age group 18-39 years old, 3000 individuals in the age group 40-59 years old, and 800 individuals in the age group 60 years old or above.

Of course, the face attributes may also be gender, the quantities of male individuals and female individuals, the quantity of individuals wearing sunglasses, the quantity of individuals wearing masks, etc. may be determined in the same way which will not be repeated here.

After the behavior characteristics or the behavior characteristics and face attributes of the individuals in the customer group passing by the display apparatus are determined in the above manner, obtained data above may be subjected to statistical analysis, and step 103 is executed.

Step 103: Statistical analysis is performed on the behavior characteristics of the customer group corresponding to the display apparatus so as to update the quantity of individuals included in each behavior characteristic.

For example, when it is determined that the behavior characteristic of any individual is passing by the display apparatus, the quantity of individuals passing by the display apparatus (which may be referred to as the quantity of people passing by) may be immediately accumulated;

when it is determined that the behavior characteristic of any individual is reaching the display apparatus, the quantity of individuals reaching the display apparatus (which may be referred to as the quantity of people reaching the display apparatus) may be immediately accumulated;

when it is determined that the behavior characteristic of any individual is paying attention to the display apparatus, the quantity of individuals paying attention to the display apparatus (which may be referred to as the quantity of people paying attention to the display apparatus) may be immediately accumulated; and when it is determined that the behavior characteristic of any individual is leaving the display apparatus, the quantity of individuals leaving the display apparatus (which may be referred to as the quantity of people leaving the display apparatus) may be immediately accumulated.

For example, according to the behavior characteristics of each individual in the customer group passing by the display apparatus, it is figured out that the quantity of individuals with the behavior characteristic being leaving the display apparatus (the invalid customer group) is x1, the quantity of individuals with the behavior characteristic being passing by the display apparatus (the valid customer group) is x2, the quantity of individuals with the behavior characteristics (namely the second behavior characteristics) being reaching the display apparatus in the valid customer group passing by the display apparatus is x3, and the quantity of individuals paying attention to the display apparatus (the valid attention customer group) is x4.

The face attributes in the valid attention customer group may be further counted, for example, the quantity of individuals included in each age group may be counted, the quantity of individuals of each gender, and the quantity of individuals wearing masks. According to these data, the group attribute of the valid customer group may be further determined, for example being females in the age group 18-39 years old.

In the process of statistics, corresponding data may be updated while statistics is performed, and above statistical results may be stored when statistics is completed or in the process of statistics, or sent to other devices, such as the interactive device, to be displayed, queried by relevant personnel, analyzed, etc. For example, according to the above statistical results, a pricing strategy for playing advertisements corresponding to the display apparatus, a strategy for injecting advertisements, etc. may be formulated.

Figure 2:
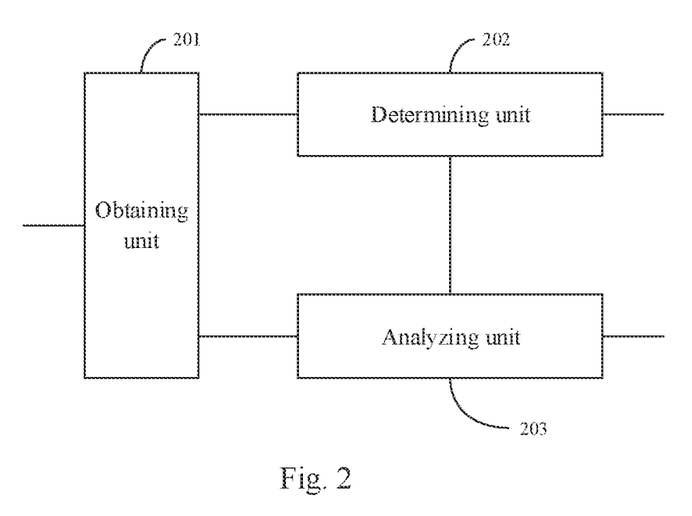
FIG. 2 is a schematic structural diagram of an apparatus for customer group analysis according to an embodiment of the present disclosure.

Based on the same inventive concept, an embodiment of the present disclosure provides an apparatus for customer group analysis. The specific implementation of a method for customer group analysis of the apparatus may refer to the description of the section of the method embodiment, which will not be repeated here. Referring to FIG. 2, the apparatus includes:

an obtaining unit 201, configured to obtain video images of a customer group of a display apparatus, wherein the display apparatus is a display region for displaying media information;

a determining unit 202, configured to recognize and track head images of the customer group in the video images, and determine behavior characteristics of individuals in the customer group; and an analyzing unit 203, configured to perform statistical analysis on the behavior characteristics of the customer group corresponding to the display apparatus, so as to update a quantity of individuals included in each behavior characteristic.

In some embodiments, the determining unit 202 is configured to:

recognize the head images of the individuals, in the video images frame by frame, and obtain a first head image set included in each frame of image;

screen out head images that reach a first preset size from the first head image set included in each frame of image to obtain a second head image set corresponding to each frame of image; and track each head image in the second head image set to determine the behavior characteristics of each individual in the customer group.

In some embodiments, the determining unit 202 is further configured to:

determine individuals corresponding to head images that have not been continuously tracked a set number of times in the second head image set as individuals in an invalid customer group, and determine corresponding behavior characteristics as leaving the display apparatus;

determine individuals corresponding to head images that have been continuously tracked the set number of times as individuals in a valid customer group, and determine corresponding first behavior characteristics as passing by the display apparatus; and determine second behavior characteristics of the individuals in the valid customer group according to an attention duration of each individual in the valid customer group paying attention to the display apparatus.

In some embodiments, the determining unit 202 is further configured to:

detect face angles of head images corresponding to the valid customer group in each frame of image, and determine a face angle of each individual in the valid customer group in the corresponding frame of image, wherein the face angle is an angle at which the face of each individual deviates from facing the display apparatus;

determine individuals with corresponding face angles being within a valid viewing angle range of the display apparatus in the valid customer group as individuals in a viewing customer group, wherein the valid viewing angle range is a view angle range at which the individuals can see display information of the display apparatus; and determine second behavior characteristics of the individuals in the viewing customer group according to an attention duration of each individual in the viewing customer group paying attention to the display apparatus.

In some embodiments, the determining unit 202 is further configured to:

determine individuals whose attention durations reach a preset attention duration in the viewing customer group as individuals in a valid attention customer group, and corresponding second behavior characteristics as paying attention to the display apparatus; and determine individuals whose attention durations do not reach the preset attention duration in the viewing customer group as individuals in an invalid attention customer group, and corresponding second behavior characteristics as reaching the display apparatus.

In some embodiments, the determining unit 202 is further configured to:

obtain a quantity of frames in which each individual in the viewing customer group is continuously determined as an individual in the viewing customer group in the video images; and determine, according to the quantity of frames and a collection rate of a video, the attention duration of each individual in the viewing customer group.

In some embodiments, the determining unit 202 is further configured to:

screen out head images that reach a second preset size and preset image quality from head images corresponding to the valid attention customer group to obtain a third head image set;

recognize face attributes of each head image in the third head image set;

perform statistical analysis on the face attributes of each head image in the third head image set, and determine a quantity of individuals included in each face attribute; and determine a face attribute containing a largest quantity of individuals as a group attribute of the valid attention customer group.

In some embodiments, the determining unit 202 is further configured to:

recognize the face attributes of each individual in the third head image set N times, wherein N is a natural number;

accumulate a value of 1 for the corresponding face attribute of the corresponding individual each time in response to a face attribute recognition is completed for each individual;

determine a face attribute with a highest accumulated value among the various face attributes corresponding to each individual as a final face attribute of the corresponding individual; and determine the quantity of individuals included in each face attribute according to the individuals corresponding to the final face attributes.

Figure 3:
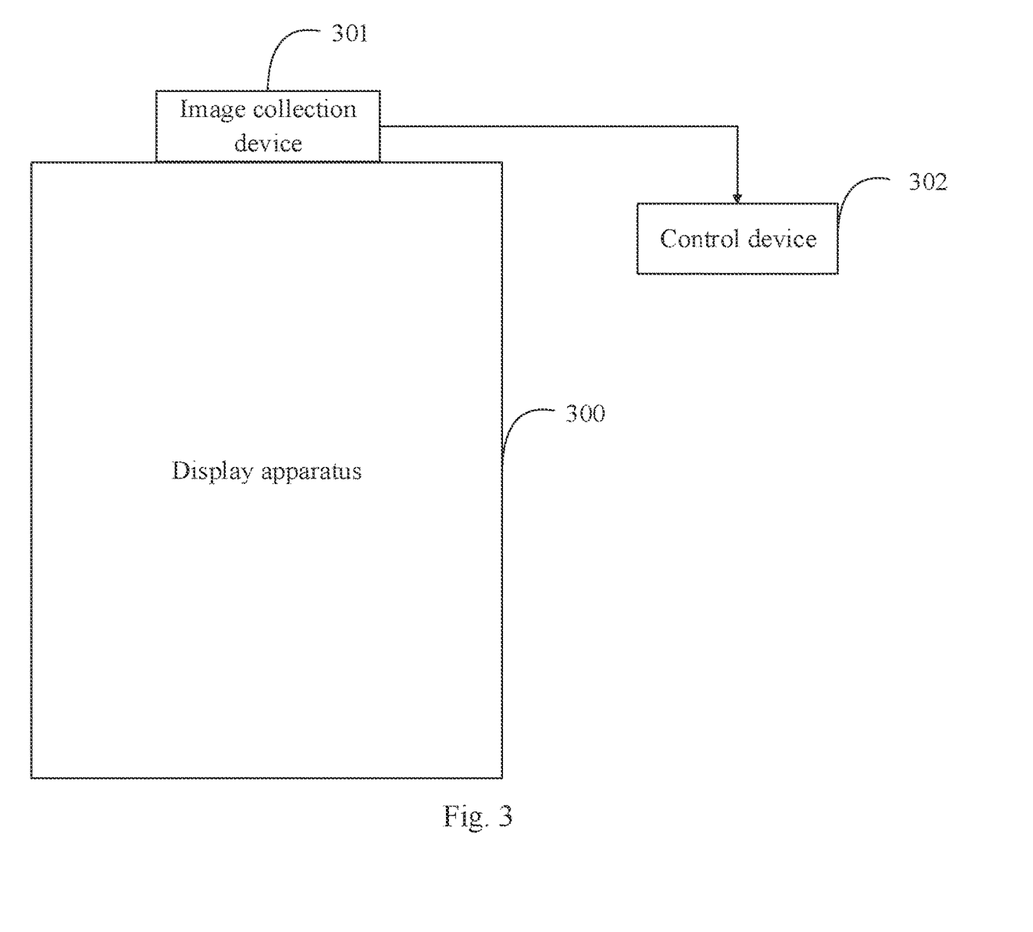
FIG. 3 is a schematic structural diagram of a system for customer group analysis according to an embodiment of the present disclosure.
Figure 4:
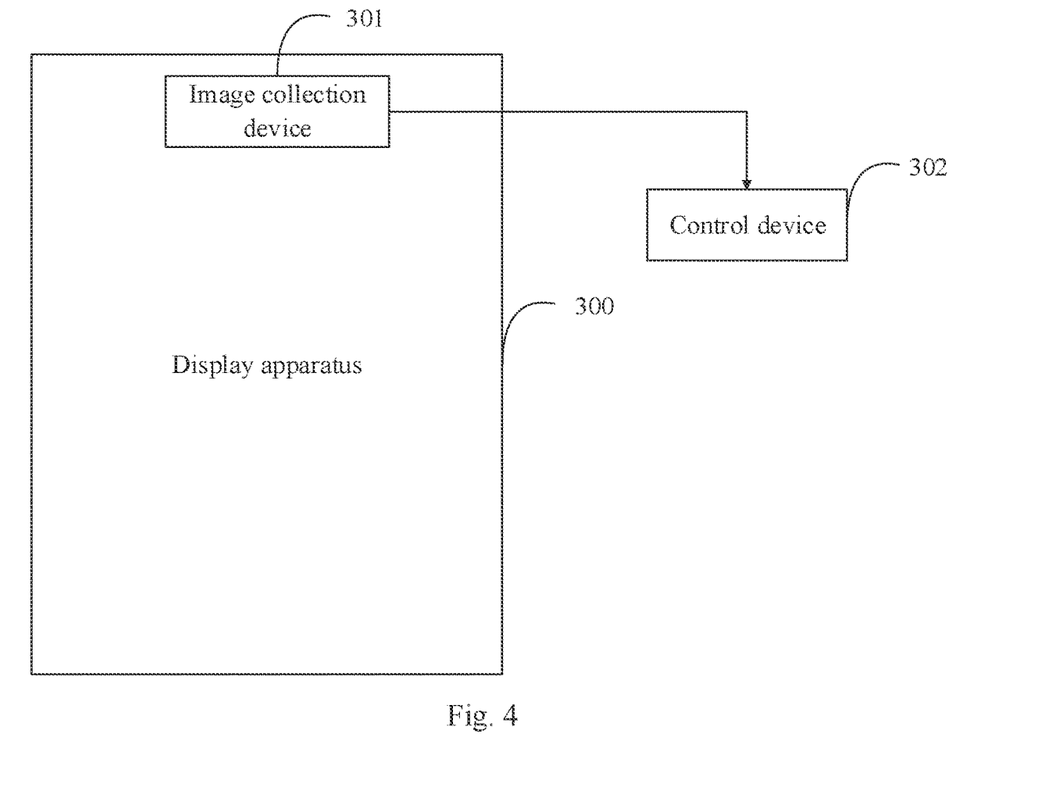
FIG. 4 is a schematic structural diagram of another system for customer group analysis according to an embodiment of the present disclosure.

Based on the same inventive concept, an embodiment of the present disclosure provides a system for customer group analysis. The specific implementation of a method for customer group analysis in the system may refer to the description of the section of the method embodiment, which will not be repeated here. Please refer to FIGS. 3 and 4, the system includes:

an image collection device 301, configured to collect video images of a customer group corresponding to a display apparatus 300; and a control device 302, configured to obtain the video images from the image collection device 301 and perform the above method for customer group analysis.

As shown in FIGS. 3 and 4, the image collection device 301 may be arranged outside (e.g., in the middle position over the display apparatus) the display apparatus 300, or may be arranged in the display apparatus 300.

Figure 5:
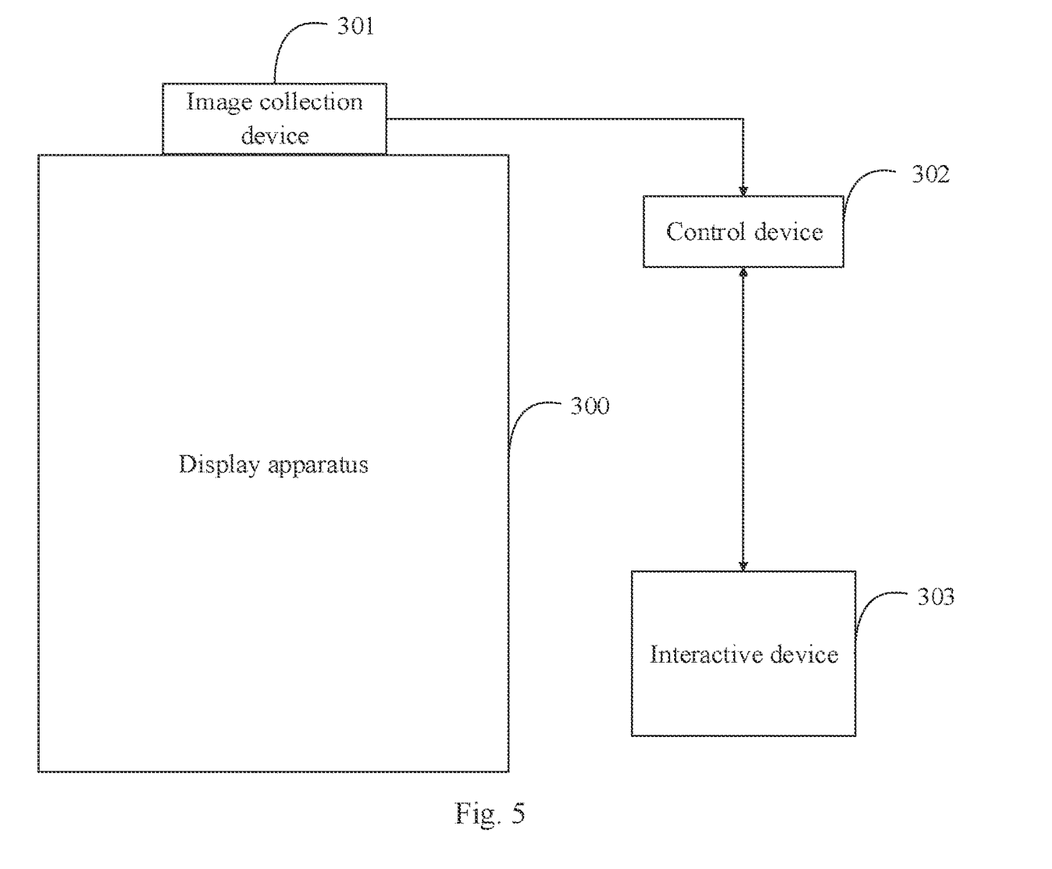
FIG. 5 is a schematic structural diagram of yet another system for customer group analysis according to an embodiment of the present disclosure.

As shown in FIG. 5 of a structural schematic diagram of another system for customer group analysis provided by the present disclosure, the system further includes:

an interactive device 303, configured to display data obtained by the control device to a user.

The user may be a relevant technical person, such as a technical person of an advertising operator, a technical person of a media company, and the like. Relevant technical persons may use the interactive device 303 to analyze the quantity of customers passing by the display apparatus 300, perform data query, and the like. For example, the quantity of people passing by, the quantity of people reaching the display apparatus and the quantity of people paying attention may be updated at a frequency of 5 s (time is configurable);

the proportion of people with different attributes may also be updated at a frequency of 1 h (time is configurable);

different passenger flow in different time periods and a variation trend may also be updated at a frequency of 1 h; and the passenger flow situation of different locations, different times, and different advertisement content may also be searched for.

In some embodiments, the interactive device 303 is further configured to display corresponding query results according to query information input by the user.

In some embodiments, the display apparatus 300 includes: a media player, or a media display board.

In some embodiments, the image collection device 301 includes: a visible light image collection device, or an infrared image collection device.

In some embodiments, the visible light image collection device includes: a visible light image sensor, or a visible light image shooting device.

In some embodiments, the infrared image collection device includes: an infrared image sensor, or an infrared thermal imager.

Based on the same inventive concept, an embodiment of the present disclosure provides an apparatus for customer group analysis, including: at least one processor, and a memory connected to the at least one processor.

The memory stores instructions executable by the at least one processor. The at least one processor executes the above method for customer group analysis by executing the instructions stored in the memory.

Based on the same inventive concept, an embodiment of the present disclosure further provides a readable storage medium, including: a memory.

The memory is configured to store instructions that, when executed by a processor, enable an apparatus including the readable storage medium to implement the above method for customer group analysis.

Those skilled in the art will appreciate that the embodiments of the present disclosure may be provided as a method, a system, or a computer program product. Accordingly, the embodiments of the present disclosure may take the form of an entirely hardware embodiment, an entirely software embodiment, or an embodiment combining software and hardware aspects.

Furthermore, the embodiments of the present disclosure may take the form of a computer program product implemented on one or more computer-usable storage media having a computer-usable program code embodied therein, including but not limited to a disk memory, a CD-ROM, an optical memory, and the like.

The embodiments of the present disclosure are described with reference to the flowcharts and/or block diagrams of the method, the device (system), and the computer program product according to the embodiments of the present disclosure. It w % ill be understood that each flow and/or block in the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor or other programmable data processing devices to produce a machine such that the instructions executed by the processor of the computer or other programmable data processing devices produce in apparatus for implementing functions specified in one or more flows of the flowcharts and/or one or more blocks of the block diagrams.

These computer program instructions may also be stored in a computer-readable memory capable of directing the computer or other programmable data processing devices to operate in a particular manner, such that the instructions stored in the computer-readable memory generate a manufacture including an instruction apparatus. The instruction apparatus implements the functions specified in one or more flows of the flowcharts and/or one or more blocks of the block diagrams.

These computer program instructions may also be loaded on the computer or other programmable data processing devices, such that a series of operational steps are performed on the computer or other programmable devices to produce a computer-implemented process. Thus, the instructions executed on the computer or other programmable devices provide a step of implementing the functions specified in one or more flows of the flowcharts and/or one or more blocks of the block diagrams.

Obviously, various changes and modifications can be made to the present disclosure by those skilled in the art without departing from the spirit and scope of the present disclosure. Thus, provided that these modifications and variations of the present disclosure fall within the scope of the claims of the present disclosure and their equivalents, the present disclosure is also intended to cover such modifications and variations.

What is claimed is:

1. A method for customer group analysis, comprising:
    obtaining video images of a customer group passing by a display apparatus;
    recognizing and tracking head images of the customer group in the video images, and determining behavior characteristics of individuals in the customer group; and
    performing a statistical analysis on the behavior characteristics of the customer group corresponding to the display apparatus, so as to update a quantity of individuals corresponding to each of the behavior characteristics;
    wherein the recognizing and tracking the head images of the customer group in the video images, and determining the behavior characteristics of individuals in the customer group, comprises:
recognizing the head images of the individuals, in the video images frame by frame, and obtaining a first head image set comprised in each frame of image;
screening out head images that reach a first preset size from the first head image set comprised in each frame of image to obtain a second head image set corresponding to each frame of image; and
tracking each head image in the second head image set to determine the behavior characteristics of each individual in the customer group;
wherein the determining the behavior characteristics of each individual in the customer group comprises:
determining individuals corresponding to head images that have not been continuously tracked a set number of times in the second head image set as individuals in an invalid customer group, and determining corresponding behavior characteristics as leaving the display apparatus;
determining individuals corresponding to head images that have been continuously tracked the set number of times as individuals in a valid customer group, and determining a first behavior characteristic as passing by the display apparatus; and
determining a second behavior characteristic of the individuals in the valid customer group according to an attention duration of each individual in the valid customer group paying attention to the display apparatus.

2. The method according to claim 1, wherein the determining the second behavior characteristic of the individuals in the valid customer group according to the attention duration of each individual in the valid customer group paying attention to the display apparatus comprises:
detecting face angles of head images corresponding to the valid customer group in each frame of image, and determining a face angle of each individual in the valid customer group in the corresponding frame of image, wherein the face angle is an angle at which the face of each individual deviates from facing the display apparatus;
determining individuals with corresponding face angles being within a valid viewing angle range of the display apparatus in the valid customer group as individuals in a viewing customer group, wherein the valid viewing angle range is a view angle range at which the individuals can see display information of the display apparatus; and
determining the second behavior characteristic of the individuals in the viewing customer group according to an attention duration of each individual in the viewing customer group paying attention to the display apparatus.

3. The method according to claim 2, wherein the determining the second behavior characteristic of the individuals in the viewing customer group according to the attention duration of each individual in the viewing customer group paying attention to the display apparatus comprises:
determining individuals whose attention durations reach a preset attention duration in the viewing customer group as individuals in a valid attention customer group, and determining a corresponding second behavior characteristic as paying attention to the display apparatus; and
determining individuals whose attention durations do not reach the preset attention duration in the viewing customer group as individuals in an invalid attention customer group, and determining a corresponding second behavior characteristic as reaching the display apparatus.

4. The method according to claim 3, wherein determining the attention duration of each individual in the viewing customer group paying attention to the display apparatus comprises:
obtaining a quantity of frames in which each individual in the viewing customer group is continuously determined as an individual in the viewing customer group in the video images; and
determining the attention duration of each individual in the viewing customer group according to the quantity of frames and a collection rate of a video.

5. The method according to claim 3, after determining the individuals whose attention durations reach the preset attention duration in the viewing customer group as the individuals of the valid attention customer group, further comprising:
screening out head images that reach a second preset size and a preset image quality from head images corresponding to the valid attention customer group to obtain a third head image set;
recognizing face attributes of each head image in the third head image set;
determining a quantity of individuals corresponding to each of the face attributes according to the face attributes of each head image in the third head image set; and
determining a face attribute corresponding to a largest quantity of individuals as a group attribute of the valid attention customer group.

6. The method according to claim 5, wherein the performing statistical analysis on the face attributes of each head image in the third head image set, and determining the quantity of individuals corresponding to each of the face attributes comprises:
recognizing the face attributes of each individual in the third head image set N times, wherein N is a natural number;
accumulating a value of 1 for the corresponding face attribute of the corresponding individual in response to a face attribute recognition being completed for each individual;
determining a face attribute with a highest accumulated value among the various face attributes corresponding to each individual as a final face attribute of the corresponding individual; and
determining the quantity of individuals corresponding to each face attribute according to the individuals corresponding to the final face attributes.

7. A system for customer group analysis, comprising:
an image collection device configured to collect video images of a customer group corresponding to a display apparatus; and
a control device configured to obtain the video images from the image collection device and perform followings:
obtaining video images of a customer group passing by a display apparatus;
recognizing and tracking head images of the customer group in the video images, and determining behavior characteristics of individuals in the customer group; and
performing a statistical analysis on the behavior characteristics of the customer group corresponding to the display apparatus, so as to update a quantity of individuals corresponding to each of the behavior characteristics;

wherein the recognizing and tracking the head images of the customer group in the video images, and determining the behavior characteristics of individuals in the customer group, comprises:

recognizing the head images of the individuals, in the video images frame by frame, and obtaining a first head image set comprised in each frame of image;

screening out head images that reach a first preset size from the first head image set comprised in each frame of image to obtain a second head image set corresponding to each frame of image; and tracking each head image in the second head image set to determine the behavior characteristics of each individual in the customer group;

wherein the determining the behavior characteristics of each individual in the customer group comprises:

determining individuals corresponding to head images that have not been continuously tracked a set number of times in the second head image set as individuals in an invalid customer group, and determining corresponding behavior characteristics as leaving the display apparatus;

determining individuals corresponding to head images that have been continuously tracked the set number of times as individuals in a valid customer group, and determining a first behavior characteristic as passing by the display apparatus; and determining a second behavior characteristic of the individuals in the valid customer group according to an attention duration of each individual in the valid customer group paying attention to the display apparatus.

8. The system according to claim 7, further comprising:
an interactive device configured to display data obtained by the control device to a user.

9. An apparatus for customer group analysis, comprising:
at least one processor, and
a memory connected to the at least one processor, wherein the memory stores instructions executable by the at least one processor, and the at least one processor executes the instructions stored in the memory to perform followings:

obtaining video images of a customer group passing by a display apparatus;

recognizing and tracking head images of the customer group in the video images, and determining behavior characteristics of individuals in the customer group; and performing a statistical analysis on the behavior characteristics of the customer group corresponding to the display apparatus, so as to update a quantity of individuals corresponding to each of the behavior characteristics;

wherein the recognizing and tracking the head images of the customer group in the video images, and determining the behavior characteristics of individuals in the customer group, comprises:

recognizing the head images of the individuals, in the video images frame by frame, and obtaining a first head image set comprised in each frame of image;

screening out head images that reach a first preset size from the first head image set comprised in each frame of image to obtain a second head image set corresponding to each frame of image; and tracking each head image in the second head image set to determine the behavior characteristics of each individual in the customer group;

wherein the determining the behavior characteristics of each individual in the customer group comprises:

determining individuals corresponding to head images that have not been continuously tracked a set number of times in the second head image set as individuals in an invalid customer group, and determining corresponding behavior characteristics as leaving the display apparatus;

determining individuals corresponding to head images that have been continuously tracked the set number of times as individuals in a valid customer group, and determining a first behavior characteristic as passing by the display apparatus; and determining a second behavior characteristic of the individuals in the valid customer group according to an attention duration of each individual in the valid customer group paying attention to the display apparatus.

10. A readable storage medium, comprising a memory, wherein
the memory is configured to store instructions that, when executed by a processor, enable an apparatus comprising the readable storage medium to implement the method according to claim 1.

11. The apparatus according to claim 8, wherein the determining the second behavior characteristic of the individuals in the valid customer group according to the attention duration of each individual in the valid customer group paying attention to the display apparatus comprises:

detecting face angles of head images corresponding to the valid customer group in each frame of image, and determining a face angle of each individual in the valid customer group in the corresponding frame of image, wherein the face angle is an angle at which the face of each individual deviates from facing the display apparatus;

determining individuals with corresponding face angles being within a valid viewing angle range of the display apparatus in the valid customer group as individuals in a viewing customer group, wherein the valid viewing angle range is a view angle range at which the individuals can see display information of the display apparatus; and determining the second behavior characteristic of the individuals in the viewing customer group according to an attention duration of each individual in the viewing customer group paying attention to the display apparatus.

12. The apparatus according to claim 11, wherein the determining the second behavior characteristic of the individuals in the viewing customer group according to the attention duration of each individual in the viewing customer group paying attention to the display apparatus comprises:

determining individuals whose attention durations reach a preset attention duration in the viewing customer group as individuals in a valid attention customer group, and determining a corresponding second behavior characteristic as paying attention to the display apparatus; and determining individuals whose attention durations do not reach the preset attention duration in the viewing customer group as individuals in an invalid attention customer group, and determining a corresponding second behavior characteristic as reaching the display apparatus.

13. The apparatus according to claim 12, wherein determining the attention duration of each individual in the viewing customer group paying attention to the display apparatus comprises:
- obtaining a quantity of frames in which each individual in the viewing customer group is continuously determined as an individual in the viewing customer group in the video images; and
- determining the attention duration of each individual in the viewing customer group according to the quantity of frames and a collection rate of a video.

14. The apparatus according to claim 12, after determining the individuals whose attention durations reach the preset attention duration in the viewing customer group as the individuals of the valid attention customer group, further comprising:
- screening out head images that reach a second preset size and a preset image quality from head images corresponding to the valid attention customer group to obtain a third head image set;
- recognizing face attributes of each head image in the third head image set;
- determining a quantity of individuals corresponding to each of the face attributes according to the face attributes of each head image in the third head image set; and
- determining a face attribute corresponding to a largest quantity of individuals as a group attribute of the valid attention customer group.

15. The apparatus according to claim 14, wherein the performing statistical analysis on the face attributes of each head image in the third head image set, and determining the quantity of individuals corresponding to each of the face attributes comprises:
- recognizing the face attributes of each individual in the third head image set N times, wherein N is a natural number;
- accumulating a value of 1 for the corresponding face attribute of the corresponding individual in response to a face attribute recognition being completed for each individual;
- determining a face attribute with a highest accumulated value among the various face attributes corresponding to each individual as a final face attribute of the corresponding individual; and
- determining the quantity of individuals corresponding to each face attribute according to the individuals corresponding to the final face attributes.

* * * * *